(12) United States Patent
Geers et al.

(10) Patent No.: US 9,396,854 B2
(45) Date of Patent: *Jul. 19, 2016

(54) PROCESS AND APPARATUS FOR REMOVING GASEOUS CONTAMINANTS FROM GAS STREAM COMPRISING GASEOUS CONTAMINANTS

(75) Inventors: Henricus Abraham Geers, Rijswijk (NL); Helmar Van Santen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/061,435

(22) PCT Filed: Aug. 27, 2009

(86) PCT No.: PCT/EP2009/061042
§ 371 (c)(1),
(2), (4) Date: Feb. 28, 2011

(87) PCT Pub. No.: WO2010/023238
PCT Pub. Date: Mar. 4, 2010

(65) Prior Publication Data
US 2011/0167869 A1 Jul. 14, 2011

(30) Foreign Application Priority Data
Aug. 29, 2008 (EP) ..................... 08163317

(51) Int. Cl.
*F25J 3/08* (2006.01)
*B01D 9/04* (2006.01)
(Continued)

(52) U.S. Cl.
CPC . *H01F 5/04* (2013.01); *C10L 3/104* (2013.01); *F25J 3/067* (2013.01); *F25J 3/0635* (2013.01);
(Continued)

(58) Field of Classification Search
CPC ..... F25J 2220/66; F25J 2240/60; C10L 3/104

USPC ............... 62/629, 637, 617–618, 620; 203/DIG. 14; 95/37, 183
See application file for complete search history.

(56) References Cited

U.S. PATENT DOCUMENTS 2,900,797 A * 8/1959 Kurata ................. B01D 53/002
  55/DIG. 25
2,996,891 A 8/1961 Tung ................................ 62/12
(Continued)

FOREIGN PATENT DOCUMENTS

DE 19739473 3/1999
WO WO03062725 7/2003 .............. F25J 3/08
(Continued)

OTHER PUBLICATIONS

R.C. Haut, E.R. Denton, and E.R. Thomas, "Development and Application of the Controlled-Freeze-Zone Process." Society of Petroleum Engineers. SPE Production Engineering. Aug. 1989.*
(Continued)

*Primary Examiner* — John F Pettitt
*Assistant Examiner* — Tareq Alosh

(57) ABSTRACT

The invention provides a process and a device for removing gaseous contaminants from a feed gas stream which comprises methane and gaseous contaminants, in which process the feed gas stream is cooled to obtain a slurry which comprises solid contaminant, liquid phase contaminant and a methane enriched gaseous phase, the slurry so obtained is introduced into a cryogenic separation device (4) in which from the top the methane enriched gaseous phase is removed (5), the slurry is diluted with liquid phase contaminant (6) and introduced as suction fluid into an ejector (9) via which it is passed into a heat exchanger (10) arranged outside the separation device and wherein solid contaminant is melted into liquid phase contaminant, part of the liquid phase contaminant so obtained is recycled (6) to dilute the slurry of contaminants inside the separation device and part (13) is introduced into the bottom part of the separation device, liquid phase is withdrawn (14) from the bottom part of the separation device, and part of the withdrawn liquid phase contaminant is recovered as a stream product (16) and part is recycled (17) to the ejector for use a motive fluid.

14 Claims, 1 Drawing Sheet

(51) Int. Cl.
   *H01F 5/04* (2006.01)
   *F25J 3/06* (2006.01)
   *C10L 3/10* (2006.01)
   *H01F 27/28* (2006.01)
   *H01R 13/66* (2006.01)
   *H01R 24/64* (2011.01)

(52) U.S. Cl.
   CPC ......... *H01F 27/2895* (2013.01); *F25J 2205/02* (2013.01); *F25J 2205/20* (2013.01); *F25J 2210/60* (2013.01); *F25J 2215/60* (2013.01); *F25J 2215/80* (2013.01); *F25J 2220/66* (2013.01); *F25J 2240/60* (2013.01); *H01R 13/6633* (2013.01); *H01R 13/6658* (2013.01); *H01R 24/64* (2013.01)

(56) References Cited

U.S. PATENT DOCUMENTS

| | | | | |
|---|---|---|---|---|
| 3,132,016 | A | | 5/1964 | Kurata .............................. 62/15 |
| 3,398,544 | A | | 8/1968 | Crownover ....................... 62/12 |
| 3,867,195 | A | * | 2/1975 | Pfeuffer .......................... 127/22 |
| 4,533,372 | A | * | 8/1985 | Valencia et al. ................ 62/629 |
| 5,062,270 | A | * | 11/1991 | Haut et al. ..................... 62/629 |
| 5,120,338 | A | * | 6/1992 | Potts et al. ..................... 62/629 |
| 5,730,860 | A | * | 3/1998 | Irvine ............................. 208/213 |
| 5,819,555 | A | * | 10/1998 | Engdahl ......................... 62/637 |
| 5,980,698 | A | * | 11/1999 | Abrosimov et al. ............ 203/94 |
| 2002/0174678 | A1 | * | 11/2002 | Wilding et al. ................. 62/602 |
| 2002/0189443 | A1 | * | 12/2002 | McGuire ............... B01D 53/24 95/32 |
| 2008/0034789 | A1 | * | 2/2008 | Fieler ...................... C10L 3/10 62/623 |
| 2011/0132034 | A1 | * | 6/2011 | Beaumont et al. .............. 62/620 |
| 2011/0144407 | A1 | * | 6/2011 | Houtekamer et al. ........ 585/818 |

FOREIGN PATENT DOCUMENTS

| | | | |
|---|---|---|---|
| WO | WO2004070297 | 8/2004 | ................ F25J 3/06 |
| WO | 2007030888 | 3/2007 | |
| WO | WO2008091316 | 7/2008 | ................ F25J 3/00 |

OTHER PUBLICATIONS

Perry's Handbook for Chemical Engineering, 8th Ed., Ch. 10 (2007).*
Thomas, E. R et al., "Gas Separation and Purification", Guildford, Surrey, GB, vol. 2; Jun. 1, 1988; pp. 84-89; XP001223902, Fig. 2.

* cited by examiner

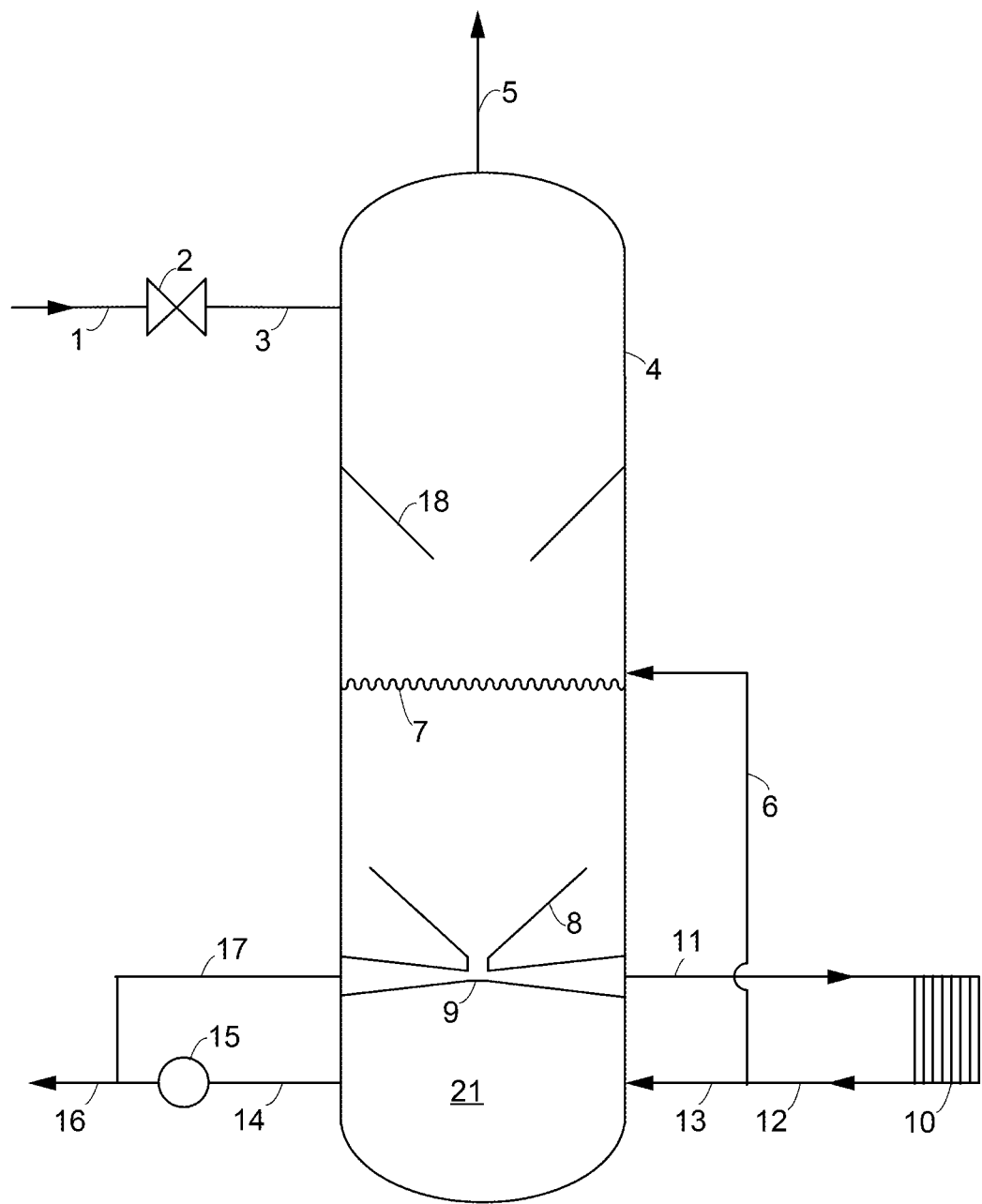

US 9,396,854 B2

PROCESS AND APPARATUS FOR REMOVING GASEOUS CONTAMINANTS FROM GAS STREAM COMPRISING GASEOUS CONTAMINANTS

The present invention concerns a process for removing gaseous contaminants, especially carbon dioxide and/or hydrogen sulphide, from a feed gas stream comprising methane and gaseous contaminants. The invention further comprises a cryogenic separation device to carry out the process, as well as products made in the process.

The removal of acid contaminants, especially carbon dioxide and/or hydrogen sulphide, from methane containing gas streams has been described in a number of publications.

In WO 03/062725 a process is described for the removal of freezable species from a natural gas stream by cooling a natural gas stream to form a slurry of solid acidic contaminants in compressed liquefied natural gas. The solids are separated from the liquid by means of a cyclone. It will be clear that a complete separation of the liquid from the solids is not easily achieved.

In U.S. Pat. No. 4,533,372 a cryogenic process is described for the removal of carbon dioxide and other acidic gases from methane-containing gas by treating the feed stream in a distillation zone and a controlled freezing zone. This is a rather complicated process requiring very specific equipment.

In U.S. Pat. No. 3,398,544 a process is described for the removal of acid contaminants from a natural gas stream by cooling to liquefy the stream and to partly solidify the stream, followed by expansion and separation of cleaned gas and liquid streams from the solids. Solid contaminants need to be removed from the separation vessel, which is a complicated process when the loss of natural gas liquid is to be minimized.

In WO 2004/070297 a process for removing contaminants from a natural gas stream has been described. In a first step, water is removed from the feed gas stream. This is especially done by cooling the feed gas stream resulting in methane hydrate formation, followed by removal of the hydrates. Further cooling results in the formation of solid acidic contaminants. After separation of the solid acidic contaminants a cleaned natural gas stream is obtained. It is preferred to convert the solid contaminant into a liquid by heating the solids.

A problem of the process as described in WO 2004/070297 is the removal of the contaminants in a reliable way from the separation vessel, as well as the removal of a pure liquid only, free from solid particles. In this respect it is observed that the continuous stream of solid particles in the described process will occasionally result in the formation of a thick layer of solid material on top of the heat exchanger. Furthermore, a layer of solid material may built up on the bottom of the vessel since solid $CO_2$ has a high density compared to the liquid stream. In addition, it is important to withdraw a pure liquid stream from the vessel in order to avoid blockages in the piping system and/or heat exchangers, as well as damages of pumps and other devices.

Object of the present invention is to provide an improved cryogenic separation process which attractively deals with the above-indicated problems.

Surprisingly it is now been found that this can be established by means of a particular sequence of process steps wherein use is made of an eductor, a heat exchanger and the recirculation of liquid phase contaminant obtained from the heat exchanger.

Accordingly, the present invention relates to process for removing gaseous contaminants from a feed gas stream which comprises methane and gaseous contaminants, the process comprising:

1) providing the feed gas stream;
2) cooling the feed gas stream to a temperature at which part of the contaminants solidify to obtain a slurry which comprises solid contaminant, liquid phase contaminant and a methane enriched gaseous phase;
3) introducing the slurry obtained in step 2) into the top or intermediate part of a cryogenic separation device;
4) removing from the top part of the cryogenic separation device a stream which comprises the methane enriched gaseous phase;
5) introducing a stream comprising liquid phase contaminant into the intermediate or the bottom part or both of the cryogenic separation device to obtain a diluted slurry of contaminants;
6) introducing the diluted slurry of contaminants obtained in step 5) via an eductor into a heat exchanger in which solid contaminant present in the diluted slurry of contaminants is melted into liquid phase contaminant, wherein the heat exchanger is positioned outside the separation device, and the eductor is arranged inside or outside the cryogenic separation device or partly inside and outside the cryogenic separation device;
7) introducing part or all of the liquid phase contaminant obtained in step 6) into a gas-liquid separator, wherein the gas-liquid separator is preferably the bottom part of the cryogenic separation device;
8) introducing part or all of the liquid phase contaminant obtained in step 6) into the separation device as described above in step 5);
9) removing from the gas-liquid separator a stream of liquid phase contaminant; and
10) separating the stream of liquid contaminant obtained in step 9) into a liquid product stream and a recirculation stream which is used as a motive fluid in the eductor.

BRIEF DESCRIPTION OF THE DRAWINGS

FIG. 1 shows a natural gas processing system.

DETAILED DESCRIPTION OF THE INVENTION

In accordance with the present invention a continuously moving slurry phase is obtained, minimizing the risk of any blockages in the cryogenic separation device or in the pipelines and other pieces of equipment. Further, when a fully liquid stream is withdrawn from the heat exchanger, the absence of solid contaminant reduces the risk of blockages or erosion in subsequent pipelines or other equipment, and no damages will occur to any devices having moving parts, such as pumps. Preferably, a static mixer will be used in the feed line to the heat exchanger to distribute solid $CO_2$ particles evenly across the heat exchanger. Moreover, when a pure liquid stream is withdrawn from the heat exchanger, a relatively cold liquid stream is obtained, thus minimizing the heat requirements of the separation device, and maintaining a high amount of exchangeable cold in the product stream.

It is observed that the liquid phase contaminant as described in step 7) above, as well as the liquid phase contaminant as described in step 8) above, may contain some vapor and/or flash gas, e.g. up till 10 wt %, especially up till 5 wt %, more especially up till 2 wt %, of the total liquid phase contaminant.

Suitably, the feed gas stream to be used in accordance with the present invention is a natural gas stream in which the gaseous contaminants are carbon dioxide and/or hydrogen sulphide and/or $C_2+$-hydrocarbons.

The amount of the hydrocarbon fraction in the feed gas stream is suitably from 10 to 85 mol % of the gas stream, preferably from 25 to 80 mol %. The hydrocarbon fraction of the natural gas stream comprises especially at least 75 mol % of methane, preferably 90 mol %. The hydrocarbon fraction in the natural gas stream may suitably contain from between 0 and 25 vol % of $C_{2+}$-hydrocarbons, preferably between 0 and 20 vol % of $C_2$-$C_6$ hydrocarbons, more preferably between 0.3 and 18 vol % of $C_2$-$C_4$ hydrocarbons, especially between 0.5 and 15 vol % of ethane. The gas stream may also comprise up to 20 vol %, suitably from 0.1 to 10 vol % of nitrogen, based on the total gas stream.

The amount of carbon dioxide in the gas stream is suitably between 15 and 90 vol %, preferably between 20 and 75 vol %, and/or the amount of hydrogen sulphide, if present, in the gas stream is suitably between 5 and 40 vol %, preferably between 20 and 35 vol % These amounts are based on the total volume of hydrocarbons, hydrogen sulphide and carbon dioxide. It is observed that the present process is especially suitable for gas streams comprising large amounts of sour contaminants, e.g. 10 mol % or more, suitably from 15 to 90 mol %.

In the process according to the present invention the feed gas stream in step 1) has suitably a temperature between −5 and 150° C., preferably between −10 and 70° C., and a pressure between 10 and 700 bara, preferably between 20 and 200 bara.

The cooling in step 2) of the present process can suitably be done by isenthalpic expansion, preferably isenthalpic expansion over an orifice or a valve, especially a Joule-Thomson valve, or in which the cooling is done by nearly isentropic expansion, especially by means of an expander, preferably a turbo expander or a laval nozzle. A valve is in particular preferred.

In step 2) the feed gas stream is suitably cooled to a temperature between −40 and −100° C., preferably between −50 and −80° C.

Suitably, the feed gas stream is pre-cooled to a temperature between 15 and −45° C., preferably between 5 and −25° C., before expansion.

Suitably, such a pre-cooling of the feed gas stream is done by heat exchange against a cold fluidum, especially an external refrigerant, e.g. a propane cycle, an ethane/propane cascade or a mixed refrigerant cycle, or an internal process loop, suitably a carbon dioxide of hydrogen sulphide stream, or a cold methane stream.

Preferably, the present process is carried out in such a way that substantially all the solid contaminant present in the diluted slurry of contaminants is melted into liquid phase contaminant in step 6). With the phrase "substantially" is meant that at least 95% of the solid contaminant present in the diluted slurry is melted, especially at least 98%. More preferably, all the solid contaminant present in the diluted slurry of contaminants is melted in step 6).

Suitably, between 1 and 90 vol % of the liquid phase contaminant obtained in step 6) is introduced in the separation device as described in step 5), preferably between 5 and 80 vol % of the liquid phase contaminant obtained in step 6). It is also possible to introduce all liquid phase contaminant obtained in step 6) in the separation device as described in step 5).

As described, part of the liquid phase contaminant is introduced into the intermediate part of the separation device and part is introduced into the bottom part. Suitably, between 10 and 100 vol %, preferably between 20 and 95 vol % of the total amount of liquid phase contaminant that is introduced into the separation device is introduced into the bottom part of the separation device in step 8). Suitably the remaining part of the liquid phase contaminant is introduced into the intermediate part of the separation device.

In the present invention solid contaminant will mainly comprise carbon dioxide, whereas liquid phase contaminant will usually comprise both carbon dioxide and hydrogen sulphide. A small amount of hydrocarbons may be present.

In accordance with the present invention the heat exchanger is preferably arranged at a level positioned below the level at which the eductor, is arranged.

Suitably, in step 10) between 25 and 95 vol % of the stream of liquid phase contaminant removed from the separation device in step 9) is used as a motive fluid in the eductor, preferably between 30 and 85 vol % of the stream of liquid phase contaminant removed from the separation device in step 9).

In accordance with the present invention, use is made of an eductor for removing the diluted slurry of contaminants from the separation device and passing/introducing said slurry into the heat exchanger. The diluted slurry of contaminants functions as the suction fluid in the eductor, whereas the recirculation stream to be introduced in the eductor in step 10) functions as the motive fluid.

Eductors, also referred to as siphons, exhausters, ejectors or jet pumps, are as such well-known and have extensively been described in the prior art. Reference herein to an eductor is to a device to pump produced solid and liquid $CO_2$ slurry from the separator to the heat exchanger. The eductor is suitably designed for use in operations in which the head pumped against is low and is less than the head of the fluid used for pumping. For a description of suitable eductors, also referred to as eductors or jet pumps, reference is made to Perry's Handbook for Chemical Engineering, 8th edition, chapter 10.2. In accordance with the present invention any type of eductor can be used. The eductor is preferably a liquid jet solid pump.

Preferably, the eductor is arranged inside the separation device or partly inside and outside the separation device.

Suitably, a housing can be positioned around the eductor, enabling the eductor to be removed from the separation device. Such a housing can, for instance, be a vessel like containment, e.g. a pipe, that can be isolated from the process through valves.

In another embodiment of the present invention the eductor is arranged outside the separation device. Such an embodiment can be useful in situations in which the eductor in use needs to be repaired or replaced.

The eductor can be of such a size that it fits completely in the separation device or it may cover the entire diameter of the separation device, usually a vessel. However, it may also extend at two locations through the internal wall of the separation device.

In step 7) of the present process the liquid phase contaminant is introduced into a gas/liquid separator, preferably the bottom part of the separation device at a level which is higher than the level at which the liquid phase contaminant is removed from the bottom part of the separation device in step b). The liquid phase contaminant may comprise some vapour and/or flash gas. This vapour and/or flash gas may be removed by means of a flash gas separator, preferably a flash gas separator located outside of the gas/liquid separator. As a result of introducing the liquid phase contaminant at a level which is higher that the level at which the liquid phase contaminant is removed, free flash gas and/or vapor can escape to the top part of the cryogenic separation device.

In general, the methane enriched gaseous phase is removed from the top part of the cryogenic separation device at a high level, preferably at the top of the reactor.

The outlet for the methane enriched gaseous phase will usually be above the level at which the stream of liquid phase contaminant obtained from the heat exchanger is introduced into the separation device in step 5).

The introduction of the slurry of contaminants obtained in step 2) will be at a level which is preferably higher than the level at which the stream of liquid phase contaminant obtained from the heat exchanger is introduced into the separation device in step 5).

Preferably, the level at which the slurry of contaminant is introduced into the separation device in step 3) will be higher than the level at which the heat exchanger will be arranged.

Preferably, the eductor is arranged at a level which is higher than the level at which the heat exchanger is arranged, allowing the diluted slurry of contaminants to flow downstream into the heat exchanger.

It will be understood that the eductor is arranged below the slurry level which is maintained in the separation vessel.

The stream of liquid phase contaminant stream that is removed from the bottom part of the separation device is suitably removed at a level below the slurry level inside the separation device.

Suitable internals may be used to prevent ingress of solid particles into the withdrawal line. Preferably a pump is installed in the withdrawal line to remove the stream of liquid phase contaminant from the bottom part of the separation device, and to power the stream of liquid phase contaminant that is to be used as the motive fluid in the eductor.

The cooling process as described in step (2) of the present process is preferably carried out at a close distance, e.g. up to a few meters, preferably at most 1 m, to the separator vessel. The separation device is suitably a vessel which comprises a vertical cylindrical housing. The diameter may vary from 1 to 10 meter, or even more, the height may vary from 3 to 35 meters or even more. In general, the slurry level in the separation vessel will vary between 30 and 70% of the height of the vessel. The temperature of the slurry is suitably about 1 to 45° C. higher than the temperature of the contaminated gas stream on introduction is the separator vessel, preferably 3 to 40° C.

The heat exchanger preferably uses a process stream to supply the heat for melting the solid contaminants. A suitable process stream is the methane enriched gaseous phase.

In step 5) the recycle of the liquid phase contaminant can be introduced into the separation device and into the slurry of contaminants at a level lower than that at which the methane enriched gaseous phase is removed from the separation device. In this way a washing stream can be created over the inside walls of the device.

Preferably, means are positioned in the separation device to direct the diluted slurry of contaminants towards the eductor. Preferably, use is made of a funnel to establish this. One or more funnels can be arranged on top of each other. Preferably in the wider part of the funnel, a grid is present to stop large chunks of falling in the more narrow inlet of the eductor/pump and in doing so, avoid plugging of the pump/eductor.

In step 7) the liquid phase contaminant is preferably introduced into the bottom part of the separation device at a level which is higher than the level at which liquid phase contaminant is removed from the bottom part of the separation device in step 8).

Preferably, in step 7) of the process according to the present invention the stream comprising liquid phase contaminant is introduced into a gas-liquid separator, preferably the bottom part of the separation device at a level which is below the level at which the eductor is arranged.

The stream introduced in step 5) has the main function to dilute the slurry and depending on the process conditions to strip some hydrocarbons and/or pre-melt some of the solids in the slurry of contaminants which has been introduced into the separation device in step 3).

Preferably, in the process according to the present in step 8) the stream comprising liquid phase contaminant is removed from the separation device at a level which is below the level at which the eductor is arranged.

Suitably, in step 9) the stream of liquid phase contaminant is removed using a pump.

Preferably, in step 10) the recirculation stream is directly introduced into the eductor.

The content of contaminants in the methane enriched gaseous phase as removed from the separation device in step 4) is suitably less than 10 vol %, preferably less than 5 vol %.

The feed gas stream provided in step 1) of the present process can suitably have been subjected to one or more purification processes in which gaseous contaminants are removed from a feed gas stream, before step 2) of the present process is carried out.

Thus, in a preferred embodiment the feed gas stream is obtained by the steps of:
a) providing a raw feed gas stream;
b) cooling the raw feed gas stream to a temperature at which liquid phase contaminant is formed as well as a methane enriched gaseous phase; and
c) separating the two phases obtained in step 2) by means of a gas/liquid separator.

Suitably, steps a) and b) can be repeated twice or three times before step 2) in accordance with the present invention is carried out. Such a process has, for instance been described in WO 2006/087332 which is hereby incorporated by reference. Hence, the feed gas stream can be subjected to a number of combinations of subsequent cooling and separation steps, before step 2) of the present invention is carried out.

Suitably, after step a) the methane enriched gaseous phase can be recompressed in one or more compression steps before step 2) in accordance with the present invention is carried out.

In order to reach gas line specifications or LNG specifications for the methane stream, the methane enriched gaseous phase obtained in step 4) may further be purified, in a cryogenic distillation process using a cryogenic distillation section which is as such known in the art.

Suitably, in such an additional cryogenic distillation process the bottom temperature of the cryogenic distillation section is between −30 and 10° C., preferably between −10 and 5° C. A reboiler may be present to supply heat to the distillation section.

Suitably, the top temperature of the cryogenic distillation section is between −110 and −80° C., preferably between −100 and −90° C. In the top of the cryogenic distillation section a condenser may be present, to provide reflux and a liquefied (LNG) product. As an alternative the remaining acidic contaminants may be extracted with an aqueous amine solution, especially aqueous ethanolamines, such as DIPA, DEA etc. Such processes are well known in the art.

The present invention also relates to a cryogenic separation device for carrying out the process according to present invention, which separation device comprises a top part, an intermediate part and a bottom part; means to introduce a slurry which comprises solid contaminant, liquid phase contaminant and an methane enriched gaseous phase into the top or intermediate part of the separation device; means to remove a methane enriched gaseous phase from the top part of the separation device; means for introducing a stream comprising liquid phase contaminant into the top or intermediate part of the separation device to dilute the slurry of contaminants inside the separation device; a heat exchanger arranged outside the separation device; a slurry pump, preferably an eductor, arranged inside or outside the separation device or partly inside and outside the separation device at a level that is below the level at which the means for introducing the slurry of contaminants into the separation device is arranged, which eductor communicates with the heat exchanger; means for directing the diluted slurry of contaminants inside the separation device towards the eductor; means to introduce liquid phase contaminant obtained in the heat exchanger to a gas-liquid separator, preferably the bottom part of the separation device; means to introduce liquid phase contaminant obtained in the heat exchanger into the top or intermediate part of the separation device; means to remove liquid phase contaminant from the bottom part of the separation device; means to separate liquid phase contaminant removed from the bottom part into a liquid product stream and a recirculation stream for use as a motive fluid in the eductor.

The means for directing the diluted slurry of contaminants inside the separation device towards the slurry pump, especially the eductor, can suitably comprise a funnel. Suitably, use can be made of a number, for instance two, funnels that are arranged one above the other.

The diluted slurry of contaminants can suitably be passed directly from the eductor into the heat exchanger. In another embodiment, however, the diluted slurry of contaminants may be passed first through means such as a conduit before it is introduced into the heat exchanger. In that case the separation device also comprises means to introduce the diluted slurry of contaminants via the eductor into the heat exchanger.

In the event that the stream of liquid phase contaminant mainly comprises carbon dioxide and is therefore a $CO_2$-rich stream, preferably the $CO_2$-rich stream is further pressurised and injected into a subterranean formation, preferably for use in enhanced oil recovery or for storage into an aquifer reservoir or for storage into an empty oil reservoir. It is an advantage that a liquid $CO_2$-rich stream is obtained, as this liquid stream requires less compression equipment to be injected into a subterranean formation. Preferably, at least 90%, more preferably at least 95% and most preferably at least 98% of the solid acidic contaminants are melted. In this way a liquid stream of contaminants is obtained, which can be easily transported further.

The invention further relates to a plant for carrying out the process as described above.

The present invention further relates to purified gas stream obtained by a process according to the present invention.

The present invention also relates to a process for liquefying a feed gas stream comprising purifying the feed gas stream in accordance with the present invention, followed by liquefying the feed gas stream by methods known in the art. In the event that the feed gas stream is a natural gas stream, the invention also provides liquefied natural gas (LNG) obtained by cooling the purified natural gas made by the process.

The invention will be further illustrated by means of FIG. 1. In FIG. 1, a natural gas is passed via a conduit 1 through an expansion means 2, especially a Joule Thomson valve, whereby a stream is obtained of a slurry which comprises solid contaminant, liquid phase contaminant and a methane enriched gaseous phase. The stream of the slurry flows via a conduit 3 into cryogenic separation vessel 4. A methane enriched gaseous is removed from the separation vessel via a conduit 5. A stream of liquid phase contaminant is introduced into the separation device via a conduit 6 to dilute the slurry inside the separation device, establishing or maintaining a slurry level 7. The diluted slurry of contaminated is directed by means of a funnel 8 towards the top opening of an eductor 9. In the eductor 9 the diluted slurry is used as a suction fluid and via the eductor 9 it is passed into a heat exchanger 10 via a conduit 11. In the heat exchanger 10 solid contaminant present in the diluted slurry is melted into liquid phase contaminant. Part of the liquid phase contaminant so obtained is passed via a conduit 12 to the conduit 6, whereas the main part of liquid phase contaminant is introduced into the bottom part 21 of the separation vessel 4 by means of a conduit 13. Liquid phase contaminant is subsequently withdrawn from the separation vessel 4 by means of a conduit 14 using a pump 15. The pump 15 may also be placed in conduit 17. Part of the withdrawn liquid phase contaminant is recovered as a product stream via a conduit 16 and part of said liquid phase contaminant is recycled via a conduit 17 to the eductor 9. A funnel 18 is present to guide the slurry stream into the direction of funnel 18.

What is claimed is:

1. A process for removing gaseous contaminants from a feed gas stream which comprises methane and gaseous contaminants, the process comprising:
    1) providing the feed gas stream;
    2) cooling the feed gas stream to a temperature at which part of the contaminants solidify to obtain a slurry which comprises solid contaminant, liquid phase contaminant and a methane enriched gaseous phase in a conduit;
    3) introducing the slurry obtained in step 2) from the conduit into the top or intermediate part of a cryogenic separation device;
    4) removing from the top part of the cryogenic separation device a stream which comprises the methane enriched gaseous phase such that a slurry containing liquid and solid phases remains in the cryogenic separation device;
    5) introducing a stream comprising the liquid phase contaminant obtained in step 6) below into the intermediate or the bottom part or both of the cryogenic separation device to obtain a diluted slurry of contaminants;
    6) introducing the diluted slurry of contaminants obtained in step 5) via an eductor into a heat exchanger in which solid contaminant present in the diluted slurry of contaminants is melted into liquid phase contaminant, wherein the heat exchanger is positioned outside the separation device, and the eductor is arranged inside the cryogenic separation device;
    7) introducing part of the liquid phase contaminant obtained in step 6) into a gas-liquid separator;
    8) introducing part of the liquid phase contaminant obtained in step 6) into the into the intermediate or the bottom part or both of the cryogenic separation device as described above in step 5);
    9) removing from the gas-liquid separator a stream of liquid phase contaminant; and
    10) separating the stream of liquid contaminant obtained in step 9) into a liquid product stream and a recirculation stream which is used as a motive fluid in the eductor.

2. A process according to claim 1, in which the feed gas stream is a natural gas stream in which the gaseous contaminants are selected from the group consisting of carbon dioxide, hydrogen sulphide and C2+-hydrocarbons.

3. A process according to claim 2, wherein the natural gas stream comprises between 15 and 90 vol % of carbon dioxide.

4. A process according to claim 2 or 3, in which the natural gas stream comprises between 0 and 25 vol % of C2+-hydrocarbons.

5. A process according to claim 2, in which the hydrocarbon fraction in the feed gas stream comprises at least 75 vol % of methane.

6. A process according to claim 1, in which the feed gas stream in step 1) has a temperature between −20 and 150° C. and a pressure between 10 and 250 bara.

7. A process according to claim 1, in which the cooling in step 2) is done by isenthalpic expansion, comprising isenthalpic expansion over an orifice or a valve.

8. A process according to claim 7, in which the feed gas stream is pre-cooled to a temperature between 15 and −35° C. before the expansion of step 2).

9. A process according to claim 8, in which the pre-cooling of the feed gas stream is done by heat exchange against a cold fluidum, comprising an external refrigerant.

10. A process according to claim 1, in which the feed gas stream is cooled in step 2) to a temperature between −40 and −100° C.

11. A process according to claim 1, in which all the solid contaminant present in the slurry of contaminants is melted in step 6).

12. A process according to claim 1, in which in step 7) the liquid phase contaminant is introduced into the bottom part of the gas-liquid separator at a level which is higher than the level at which liquid phase contaminant is removed from the bottom part of the gas-liquid separator in step 9).

13. A process according to claim 1, in which in step 5) the stream comprising liquid phase contaminant is introduced into the separation device at a level which is lower than the level at which the methane enriched gaseous phase is removed from the separation device in step 4).

14. A process for removing gaseous carbon dioxide from a feed gas stream which comprises methane and gaseous contaminants including carbon dioxide, the process comprising:

1) providing the feed gas stream;
2) cooling the feed gas stream to a temperature at which part of the carbon dioxide solidifies to obtain a slurry that comprises solid carbon dioxide, liquid phase carbon dioxide and a methane enriched gaseous phase in a conduit;
3) introducing the slurry obtained in step 2) from the conduit into the top or intermediate part of a cryogenic separation device;
4) removing from the top part of the cryogenic separation device a stream which comprises the methane enriched gaseous phase such that a slurry containing liquid and solid phases remains in the cryogenic separation device;
5) introducing a stream comprising the liquid phase carbon dioxide obtained in step 6) below into the intermediate or the bottom part or both of the cryogenic separation device to obtain a diluted slurry of carbon dioxide;
6) introducing the diluted slurry of carbon dioxide obtained in step 5) via an eductor into a heat exchanger in which solid carbon dioxide present in the diluted slurry of carbon dioxide is melted into liquid phase carbon dioxide, wherein the heat exchanger is positioned outside the separation device, and the eductor is arranged inside the cryogenic separation device;
7) introducing part of the liquid phase carbon dioxide obtained in step 6) into a gas-liquid separator;
8) introducing part of the liquid phase carbon dioxide obtained in step 6) into the into the intermediate or the bottom part or both of the cryogenic separation device as described above in step 5);
9) removing from the gas-liquid separator a stream of liquid phase carbon dioxide; and
10) separating the stream of liquid carbon dioxide obtained in step 9) into a liquid product stream and a recirculation stream which is used as a motive fluid in the eductor.

* * * * *